(12) United States Patent
Huang et al.

(10) Patent No.: US 11,233,883 B2
(45) Date of Patent: Jan. 25, 2022

(54) SYSTEMS AND METHODS FOR ACQUIRING AN INTERNET PROTOCOL NETWORK ADDRESS OF A USER EQUIPMENT IN NETWORKS

(71) Applicant: Verizon Patent and Licensing Inc., Arlington, VA (US)

(72) Inventors: Ye Huang, San Ramon, CA (US); Michael R. Waters, Staten Island, NY (US); Sameer Muhammad Farooqi, Frisco, TX (US); Sudhir Patel, Boonton, NJ (US); Jeremy Nacer, Denville, NJ (US); Miguel A. Carames, Long Valley, NJ (US); Andrew E. Youtz, Princeton, NJ (US); Gregory S. Blazi, Ft. Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 16/815,640

(22) Filed: Mar. 11, 2020

(65) Prior Publication Data
US 2021/0289060 A1    Sep. 16, 2021

(51) Int. Cl.
| H04L 12/28 | (2006.01) |
| H04L 29/06 | (2006.01) |
| H04L 29/12 | (2006.01) |
| H04W 4/14 | (2009.01) |
| H04W 80/04 | (2009.01) |

(52) U.S. Cl.
CPC ........ *H04L 69/167* (2013.01); *H04L 61/1511* (2013.01); *H04L 61/2007* (2013.01); *H04L 61/251* (2013.01); *H04L 61/6059* (2013.01); *H04W 4/14* (2013.01); *H04W 80/045* (2013.01)

(58) Field of Classification Search
CPC ....................................................... H04L 12/28
USPC ........................................................ 370/389
See application file for complete search history.

(56) References Cited

U.S. PATENT DOCUMENTS

| 9,037,724 B2 * | 5/2015 | Kavanaugh ......... H04L 61/2517 |
| | | 709/226 |
| 10,548,062 B2 * | 1/2020 | Cui ....................... H04W 40/28 |

* cited by examiner

*Primary Examiner* — Dang T Ton

(57) ABSTRACT

A device may determine that an application server requires an IPv6 address of a user equipment, and may provide, to another network device, a request for the IPv6 address of the user equipment, wherein the request includes data identifying an IP address of the network device and a port of the network device, and wherein the request is to cause the other network device to provide the request for the IPv6 address to the user equipment via a SMS request message, and receive, from the user equipment, data identifying the IPv6 address and a port of the user equipment via a SMS response message. The network device may receive, from the other network device, a response that includes the data identifying the IPv6 address and the port of the user equipment, and may store the data identifying the IPv6 address and the port of the user equipment.

20 Claims, 9 Drawing Sheets

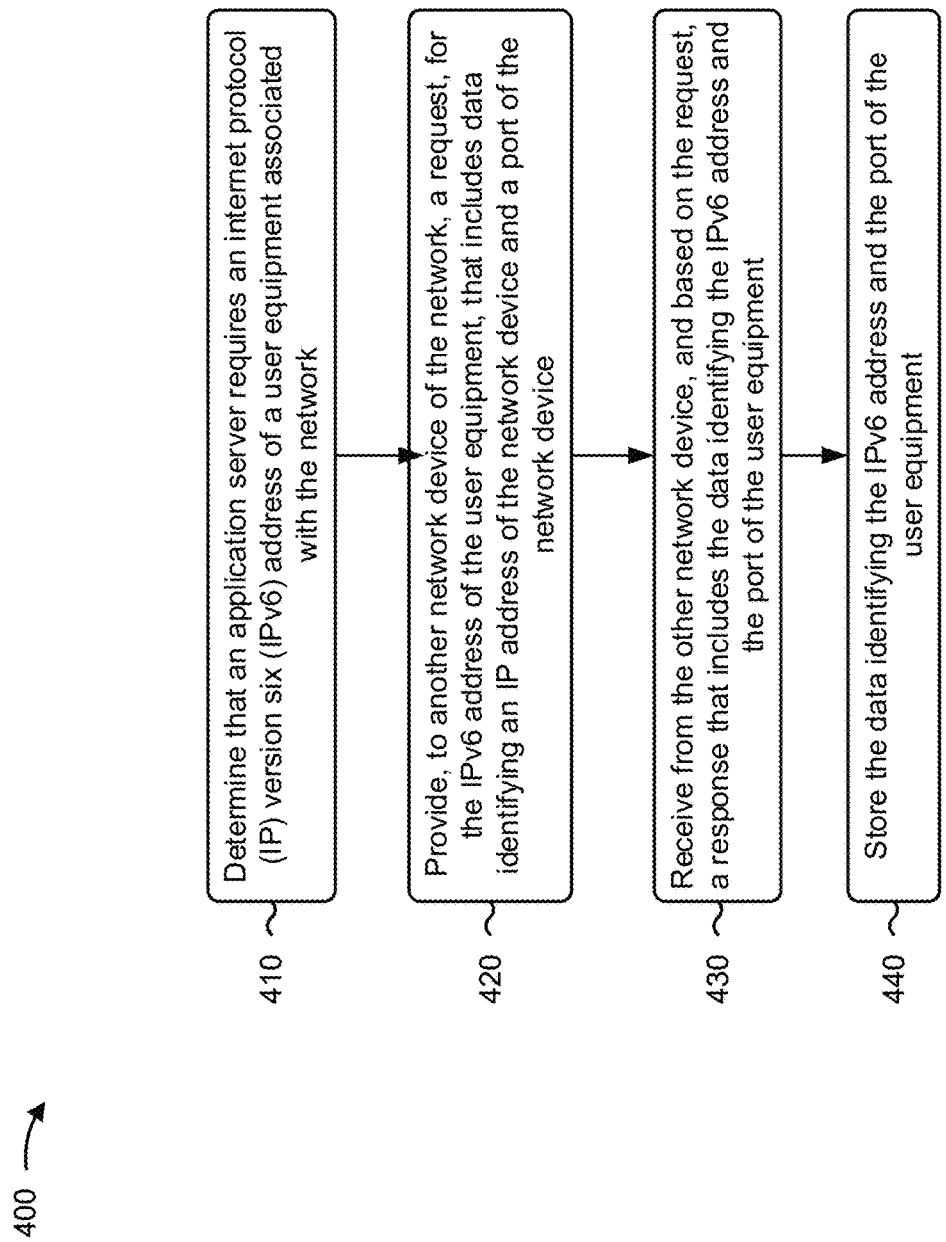

SYSTEMS AND METHODS FOR ACQUIRING AN INTERNET PROTOCOL NETWORK ADDRESS OF A USER EQUIPMENT IN NETWORKS

BACKGROUND

A network device, such as a service capability exposure function (SCEF), may deliver Internet protocol (IP) data over a user plane in networks, such as a fourth generation (4G) core network, a fifth generation (5G) next generation (NG) core network, and/or the like.

BRIEF DESCRIPTION OF THE DRAWINGS

FIG. 4 is a flow chart of an example process for acquiring a particular Internet protocol (IP) network address of a user equipment in networks.

DETAILED DESCRIPTION OF PREFERRED EMBODIMENTS

Figure 1A:
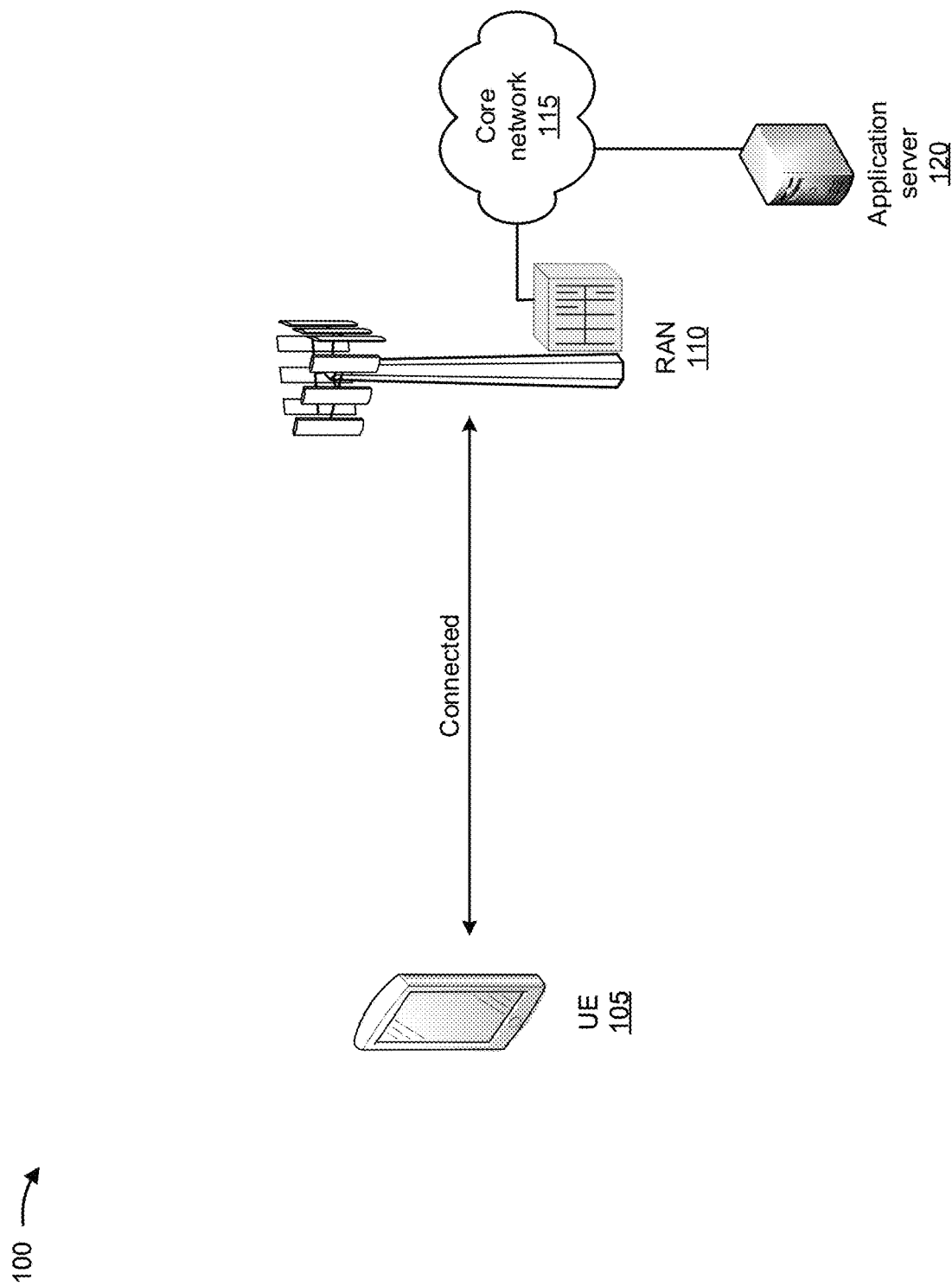
FIGS. 1A-1F are diagrams of one or more example implementations described herein.

The following detailed description of example implementations refers to the accompanying drawings. The same reference numbers in different drawings may identify the same or similar elements.

An SCEF may receive, from a packet data network gateway (PGW), a policy and charging rules function (PCRF), and/or a monitoring report, a request to create PDN session that includes a network address (e.g., IP address) of a user equipment via a remote authentication dial-in user service (RADIUS) procedure, a Diameter procedure, and/or the like. The SCEF may create a mapping between an IP address and a port of the user equipment and an IP address and a port associated with an application server for subsequent communications between the user equipment and the application server over the user plane. However, for IP version 6 (IPv6) address assignment, the PGW may provide a block of IPv6 addresses (e.g., specified by an IPv6 prefix) for the user equipment to the SCEF. Such a configuration may function for user equipment-originated traffic, but fails to function for SCEF-enabled services that require a unique IPv6 address for the user equipment (e.g., PDN IP traffic flow quality of service (QoS) control services, SCEF or application server-initiated data deliveries to the user equipment, application programming interface (API) services provided by the SCEF, services provided by the application server, and/or the like). This wastes computing resources (e.g., processing resources, memory resources, communication resources, and/or the like), networking resources, and/or the like associated with attempting to identify an IP address of the user equipment, providing data to an incorrect IP address of the user equipment, failing to provide data to the user equipment, and/or the like.

Some implementations described herein provide a device (e.g., a network device, such as an SCEF) that acquires a particular IP network address (e.g., an IPv6 address) of a user equipment in networks. For example, the SCEF may determine that an application server requires an IPv6 address of a user equipment associated with a network, and may provide, to a network device of the network, a request for the IPv6 address of the user equipment. The request may include data identifying an IP address and a port of the network device, and the request may cause the network device to provide the request for the IPv6 address to the user equipment via a short message service (SMS) request message, and receive, from the user equipment, data identifying the IPv6 address and a port of the user equipment via a SMS response message. The SCEF may receive, from the network device and based on the request, a response that includes the data identifying the IPv6 address and the port of the user equipment, and may store the data identifying the IPv6 address and the port of the user equipment.

In this way, the SCEF acquires a particular IPv6 address of a user equipment in networks. This enables SCEF-based services that require a unique IPv6 address for the user equipment (e.g., PDN IP traffic flow QoS control services, SCEF or application server-initiated data deliveries to the user equipment, API services provided by the SCEF, services provided by the application server, and/or the like) to be provided to the user equipment. Thus, the SCEF conserves computing resources, networking resources, and/or the like that would otherwise have been wasted attempting to identify an IP address of the user equipment, providing data to an incorrect IP address of the user equipment, failing to provide data to the user equipment, and/or the like.

FIGS. 1A-1F are diagrams of one or more example implementations 100 described herein. As shown in FIG. 1A, a user equipment 105 may be connected to a radio access network (RAN) 110 associated with a core network 115 and an application server 120. RAN 110 may include one or more radio transmitters. Core network 115 may include an example architecture of a 4G core network or a 5G NG core network included in a 5G wireless telecommunications system, and may include physical elements, virtual elements, or a combination of physical and virtual elements. Application server 120 may include an application server device that provides application data (e.g., associated with an application, such as an Internet of Things (IoT) application) to user equipment 105 and/or receives data from user equipment 105. Although implementations are described herein in connection with a 4G core network, the implementations may be utilized with other types of core networks, such as a 5G NG core network.

Figure 1B:
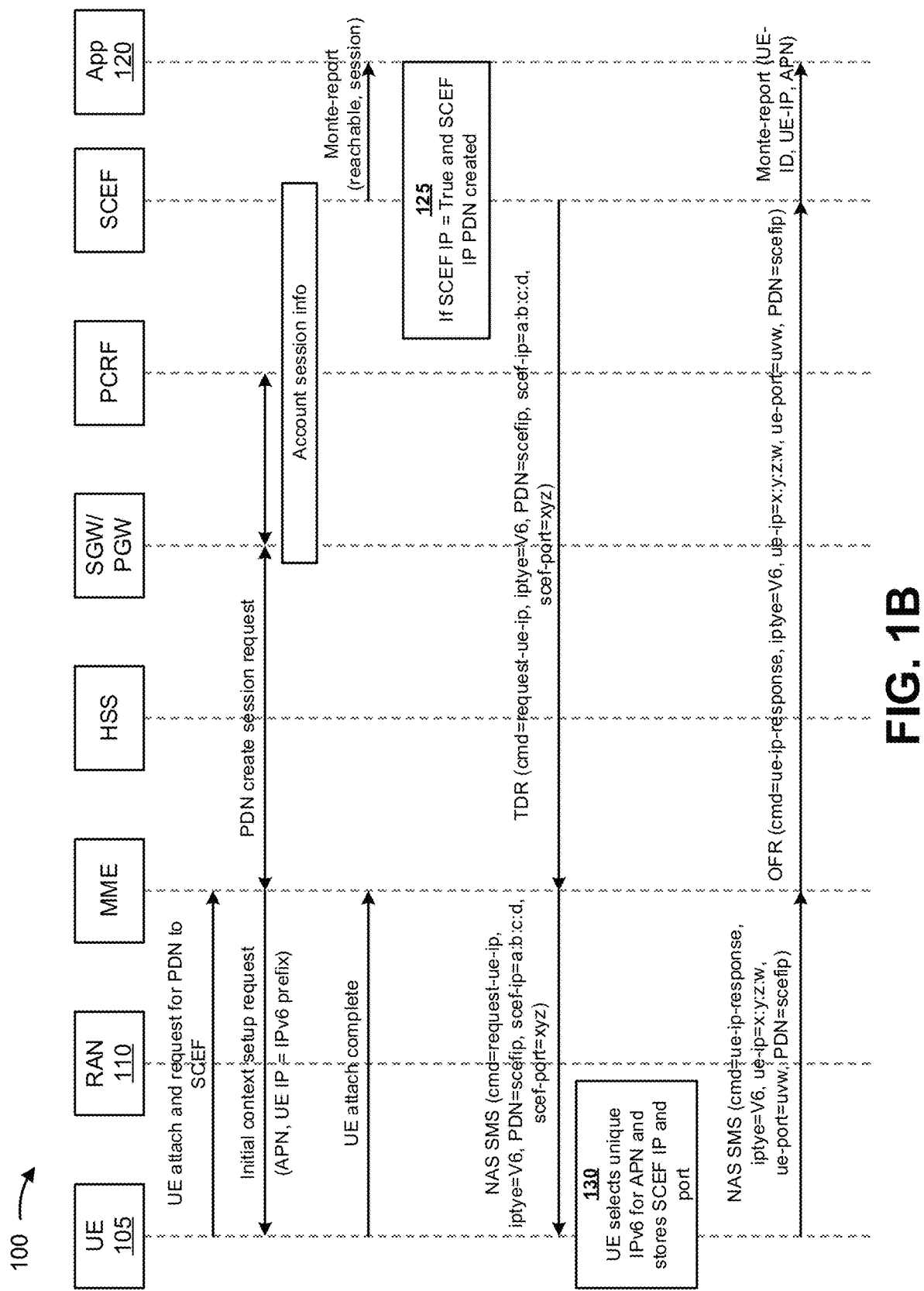
Figure 1C:
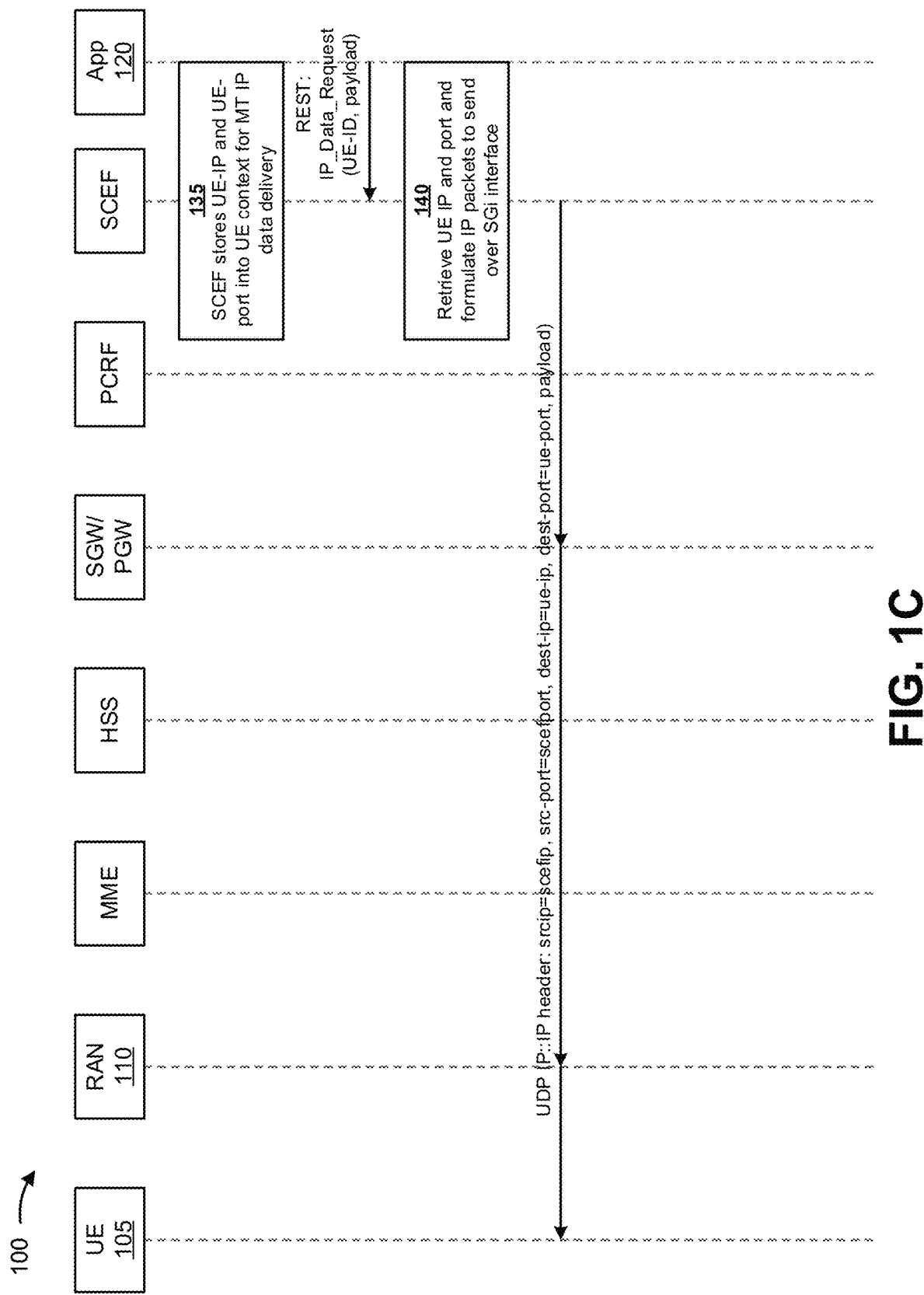

FIGS. 1B and 1C are diagrams of a protocol signaling procedure for obtaining a unique IP address assignment for user equipment 105 via a short message service (SMS) message. As shown in FIG. 1B, user 105, RAN 110, and application server 120 may be associated with a mobility management entity device (MME), a home subscriber server (HSS), serving gateway (SGW)/PGW, a PCRF, and an SCEF of core network 115.

As further shown in FIG. 1B, the MME may initially receive, from user equipment 105, a user equipment (UE) attach request and a request for a packet data network (PDN) to SCEF communication. The MME may provide an initial context setup request that includes data identifying an access point network (APN) and an IPv6 address of user equipment 105 (e.g., "APN, UE IP=IPv6 prefix"). The MME may communicate with the SGW/PGW to create a session request for the PDN, and the SGW/PGW may communicate with the PCRF to share account session information with the SCEF. Upon completion of the attach process, the MME may receive, from user equipment 105, a message indicating that the UE attach is complete for user equipment 105. Based on the message indicating that the UE attach is complete, the SCEF may provide, to application server 120, a report indicating that user equipment 105 is reachable and that a session has been established. The report may include a monitor event (Monte) report that includes information indicating that user equipment 105 is "reachable" and that a "session" has been established.

As further shown in FIG. 1B, and by reference number 125, the SCEF may determine, based on receiving the account session information and the report, that application server 120 requires an IPv6 address of user equipment 105 (e.g., "SCEF IP=True and SCEF IP PDN is created"). In this case, the SCEF may provide, to the MME, a request for the IPv6 address of user equipment 105. The request may include data identifying an IP address of the SCEF and a port of the SCEF. For example, the request may be an MT data request (TDR) that includes a command (cmd) requesting the IPv6 address of user equipment 105 (e.g., "cmd=request-ue-ip, iptye=V6, PDN=scefip, scef-ip=a:b:c:d, scef-port=xyz"). Based on receiving the request, the MME may provide the request for the IPv6 address to user equipment 105 via a non-access stratum (NAS) SMS request message.

As further shown in FIG. 1B, and by reference number 130, user equipment 105 may assign an IPv6 address and a port for user equipment 105 on behalf of application server 120, and may store the IP address and the port of the SCEF. For example, user equipment 105 may select a unique IPv6 for the APN (e.g., application server 120) and may store the SCEF IP and SCEF port. The MME may receive, from user equipment 105, data identifying the IPv6 address and a port of user equipment 105 via a NAS SMS response message. For example, user equipment 105 may send a NAS SMS message that includes a command (e.g., "cmd=ue-ip-response, iptye=V6, ue-ip=x:y:z:w, ue-port=uvw, PDN=scefip").

Based on receiving the SMS response message, the MME may provide, to the SCEF, a response that includes the data identifying the IPv6 address and the port of user equipment 105. For example, the MME may send a forward Short Message operation (OFR) message that includes a command (e.g., "cmd=ue-ip-response, iptye=V6, ue-ip=x:y:z:w, ue-port=uvw, PDN=scefip"). Based on receiving the OFR message, the SCEF may provide, to application server 120, a report that includes the data identifying the IPv6 address and the port of user equipment 105. The report may include a monitor event (Monte) report that includes information indicating the IPv6 address and the port of user equipment 105 (e.g., "UE-ID, UE-IP, APN").

As shown in FIG. 1C, and by reference number 135, the SCEF may store the data identifying the IPv6 address and the port of user equipment 105. For example, the SCEF may store UE-IP and UE-port into a UE context for MT IP data delivery. Thereafter, the SCEF may receive, from application server 120, data destined for user equipment 105. For example, the SCEF may receive, from application server 120, a representational state transfer (REST) message that includes an IP data request and a payload (e.g., "IP_Data_Request (UE-ID, payload)") to be provided to user equipment 105.

As further shown in FIG. 1C, and by reference number 140, based on receiving the data destined for user equipment 105, the SCEF may generate a packet that includes data identifying the IP address of the SCEF as a source IP address, the port of the SCEF as a source port, the IPv6 address of user equipment 105 as a destination IP address, the port of user equipment 105 as a destination port, and the data destined for user equipment 105 (e.g., the payload). For example, the SCEF may retrieve the IPv6 address and the port of user equipment 105 and may generate IP packets to send over an SGi interface. Thereafter, the SCEF may cause the packet to be forwarded to user equipment 105. For example, the SCEF may send a user datagram protocol (UDP) IP message that includes the packet (e.g., "IP header: srcip=scefip, src-port=scefport, dest-ip=ue-ip, dest-port=ue-port, payload") to user equipment 105, via the SGW/PGW and RAN 110.

Figure 1D:
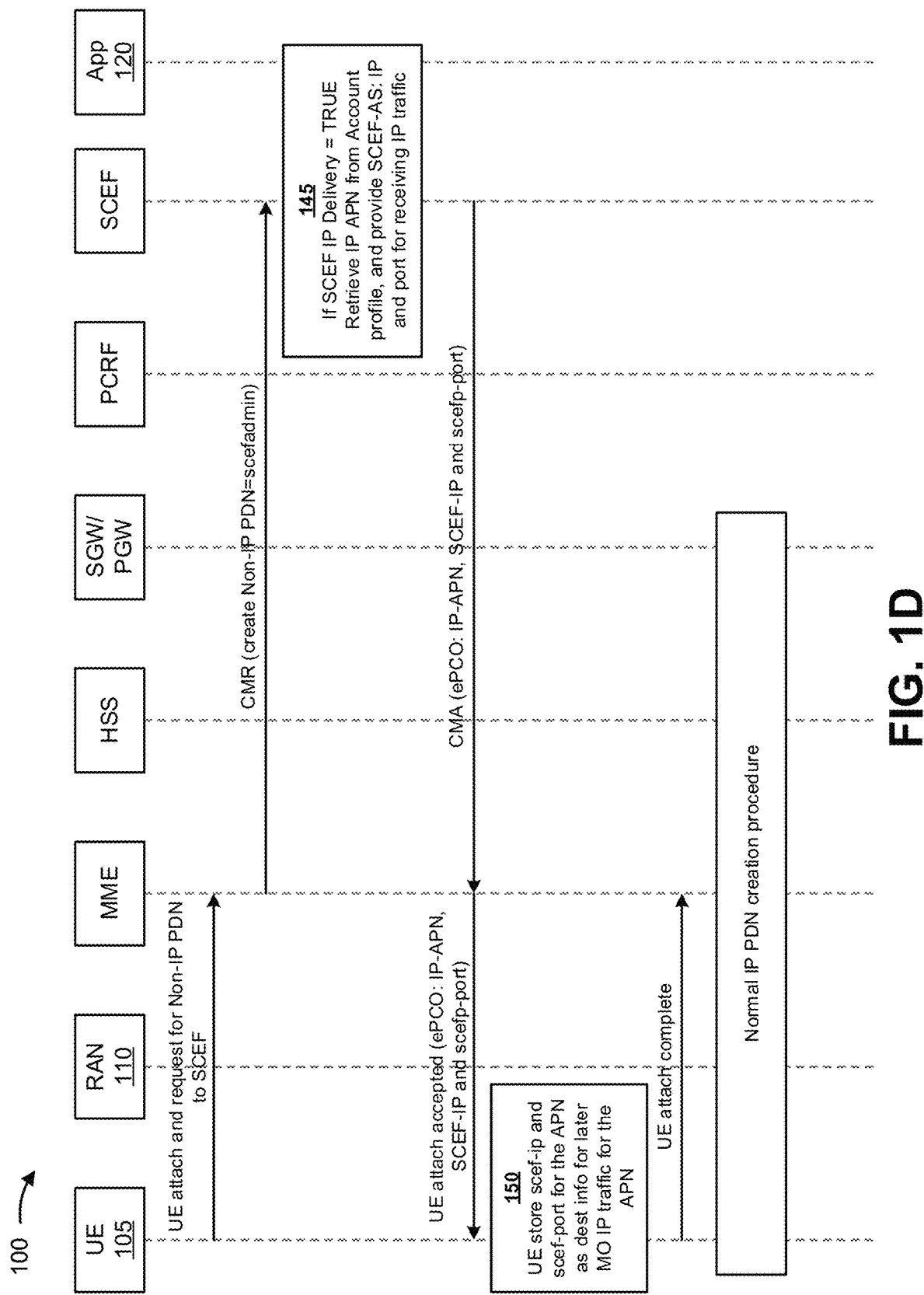
Figure 1E:
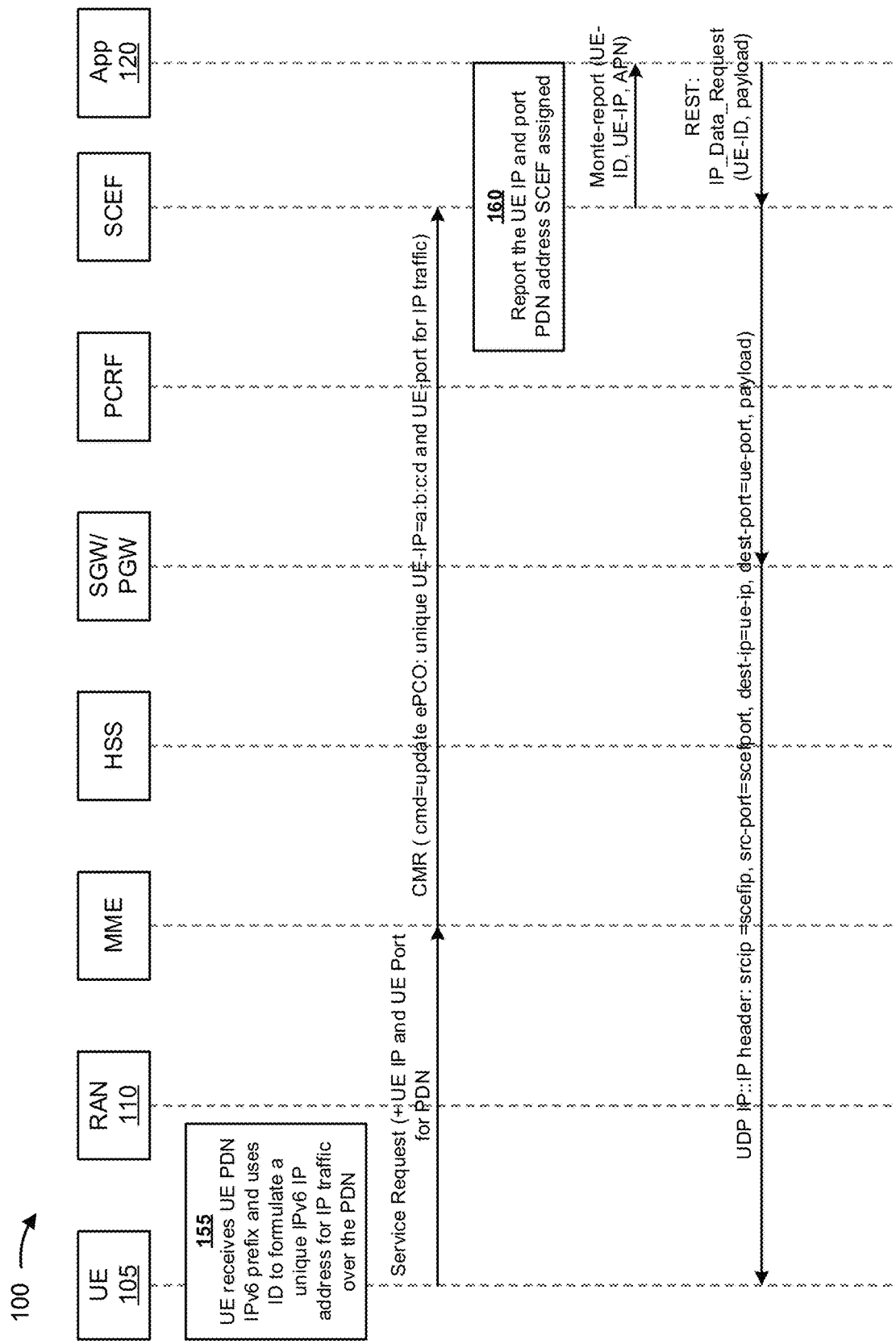

FIGS. 1D and 1E are diagrams of a protocol signaling for obtaining a unique IP address assignment for user equipment 105 via non-IP data delivery (NIDD). As shown in FIG. 1D, the MME may initially receive, from user equipment 105, a UE attach request and a request for a non-IP PDN to SCEF communication. The MME may provide, to the SCEF, a connection management request (CMR) to create a non-IP PDN session associated with user equipment 105. For example, the MME may provide a CMR message that includes "create Non-IP PDN=scefadmin."

As further shown in FIG. 1D, and by reference number 145, the SCEF may determine, based on receiving the CMR message, that application server 120 requires an IPv6 address of user equipment 105. For example, if "SCEF IP Delivery=TRUE," the SCEF may retrieve IP APN from an account profile, and may provide an IP address and a port (e.g., "SCEF-AS: IP" and "SCEF-AS: port) for receiving IP traffic. Thereafter, the SCEF may provide, to the MME and in response to the CMR, a connection management answer (CMA) that includes data identifying an IP address of the SCEF and a port of the SCEF. For example, the SCEF may provide, to MME, a CMA message that includes "ePCO: IP-APN, SCEF-IP and scefp-port." The MME may provide the data identifying the IP address and the port of the SCEF to user equipment 105 via a user equipment attach accepted message. For example, the MME may provide, to user equipment, a UE attach accepted message that includes "ePCO: IP-APN, SCEF-IP and scefp-port."

As further shown in FIG. 1D, and by reference number 150, user equipment 105 may assign an IPv6 address and a port of user equipment 105 to traffic received from application server 120, may store the data identifying the IP address and the port of the SCEF as destination information for traffic to be provided to application server 120, and may provide, to the MME, data identifying the IPv6 address and the port of user equipment 105. For example, user equipment 105 may store "scef-ip" and "scef-port" for the APN (e.g., application server 120) as destination information for later IP traffic for application server 120. User equipment 105 may then send a UE attach complete message to the MME, as shown. Thereafter, user equipment 105, RAN 110, the MME, the HHS, and/or the SGW/PGW may engage in a conventional IP PDN creation procedure.

As shown in FIG. 1E, and by reference number 155, user equipment 105 may receive a UE PDN IPv6 prefix and may utilize the UE PDN IPv6 prefix to formulate a unique IPv6 address for IP traffic over the PDN. User equipment 105 may send, to MME, a service request that includes data identifying the IPv6 address and the port of user equipment 105 (e.g., "+ UE IP and UE Port for PDN"). The MME may send, to SCEF, a CMR message that includes a command identifying the IPv6 address and the port of user equipment 105 (e.g., "cmd=update ePCO: unique UE-IP=a:b:c:d and UE-port for IP traffic"). Based on receiving the CMR message, the SCEF may provide, to application server 120, a report that includes the data identifying the IPv6 address and the port of user equipment 105. The report may include a monitor event (Monte) report that includes information indicating the IPv6 address and the port of user equipment 105 (e.g., "UE-ID, UE-IP, APN").

As further shown in FIG. 1E, by reference number 160, and based on receiving the CMR message, the SCEF may provide, to application server 120, a report that includes the data identifying the IPv6 address and the port of user equipment 105. The report may include a monitor event (Monte) report that includes information indicating the IPv6 address and the port of user equipment 105 (e.g., "UE-ID, UE-IP, APN"). The SCEF may receive, from application server 120, a REST message that includes an IP data request and a payload (e.g., "IP_Data_Request (UE-ID, payload)") to be provided to user equipment 105.

Based on receiving the data destined for user equipment 105, the SCEF may generate a packet that includes data identifying the IP address of the SCEF as a source IP address, the port of the SCEF as a source port, the IPv6 address of user equipment 105 as a destination IP address, the port of user equipment 105 as a destination port, and the data destined for user equipment 105 (e.g., the payload). The SCEF may then cause the packet to be forwarded to user equipment 105. For example, the SCEF may send a UDP IP message that includes the packet (e.g., "IP header: srcip=scefip, src-port=scefport, dest-ip=ue-ip, dest-port=ue-port, payload") to user equipment 105, via the SGW/PGW and RAN 110.

Figure 1F:
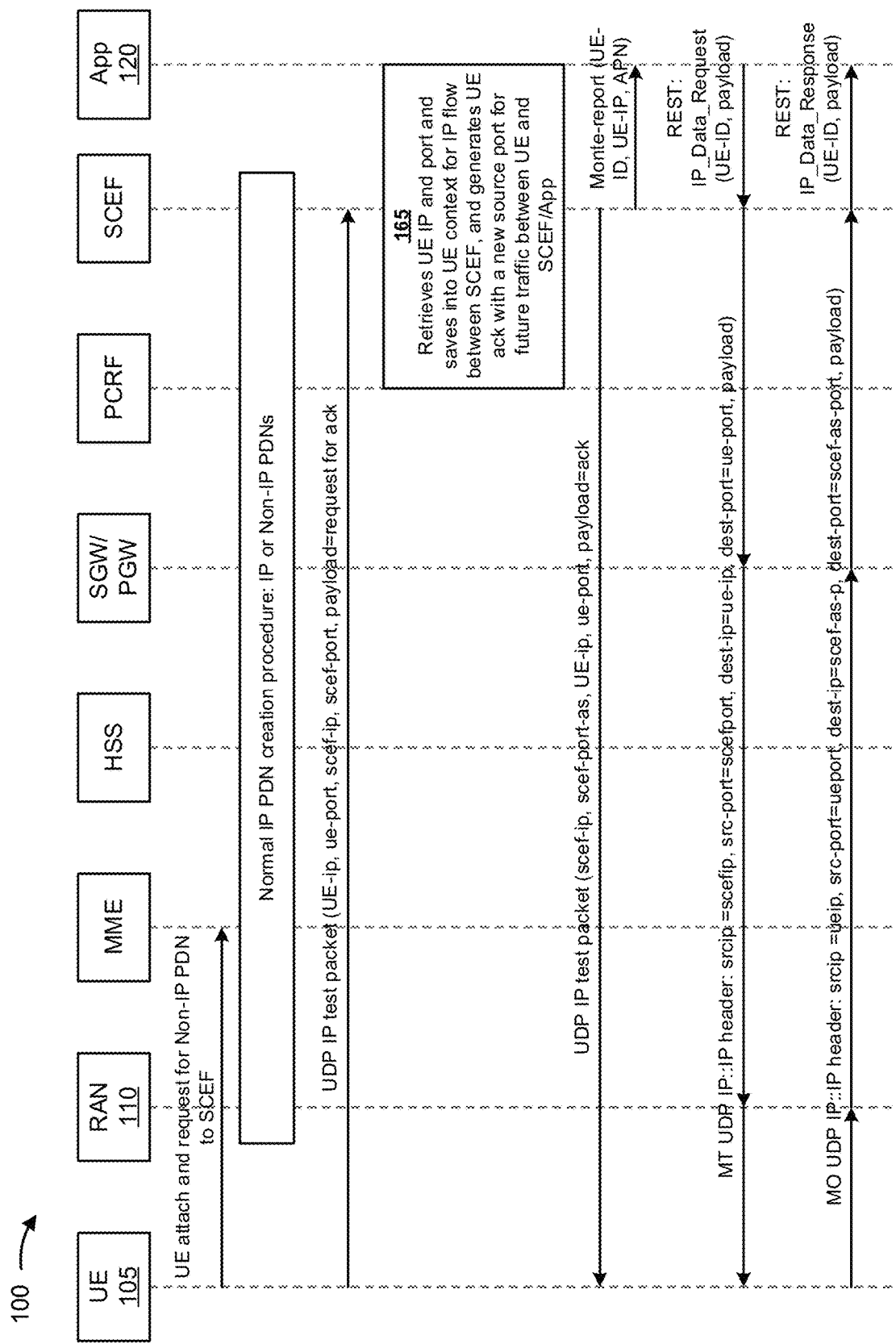

FIG. 1F is a diagram of a protocol signaling procedure for obtaining a unique IP address assignment for user equipment 105 via a UE initiated IP test packet to the SCEF. As shown, the MME may initially receive, from user equipment 105, a UE attach request and a request for a non-IP PDN to SCEF communication. The MME may communicate with RAN 110, the HSS, the SGW/PGW, the PCRF, and the SCEF to engage in a normal IP PDN creation procedure for IP or Non-IP PDNs. The SCEF may receive, from user equipment 105, an IP test packet request that includes data identifying IPv6 address of user equipment 105 as a source IP address, a port of user equipment 105 as a source port, an IP address of the SCEF as a destination IP address, a port of the SCEF as a destination port, and a payload that includes a request for acknowledgment of the IP test packet request. For example, user equipment 105 may send, to the SCEF, a UDP IP test packet that includes data (e.g., "UE-ip, ue-port, scef-ip, scef-port, payload=request for ack"). In some implementations, the IP test packet request may be received by the SCEF, from user equipment 105, based on a fully qualified domain name (FQDN) associated with the SCEF.

As further shown in FIG. 1F, and by reference number 165, the SCEF may store the data identifying the IPv6 address and the port of user equipment 105, and may generate an IP test packet response based on the IP test packet request. For example, the SCEF may retrieve the data identifying the IPv6 address and the port of user equipment 105 from the IP test packet request, and may save data identifying the IPv6 address and the port of user equipment 105 into a UE context for IP flow between the SCEF and user equipment 105. The SCEF may generate an acknowledgment (e.g., a UE ACK) with a new source port for future traffic between user equipment 105 and the SCEF and/or application server 120. The SCEF may provide, to user equipment 105, an IP test packet response that includes data identifying the IP address of the SCEF as a source IP address, another port of the SCEF as a source port, the IPv6 address of user equipment 105 as a destination IP address, the port of user equipment 105 as a destination port, and a payload that includes the acknowledgment for the IP test packet request. For example, the SCEF may send, to user equipment 105, a UDP IP test packet that includes data (e.g., "scef-ip, scef-port-as, UE-ip, ue-port, payload=ack").

As further shown in FIG. 1F, the SCEF may provide, to application server 120, a report that includes the data identifying the IPv6 address and the port of user equipment 105. The report may include a monitor event (Monte) report that includes information indicating the IPv6 address and the port of user equipment 105 (e.g., "UE-ID, UE-IP, APN"). Thereafter, the SCEF may receive, from application server 120, data destined for user equipment 105 (e.g., a REST message that includes "IP_Data_Request (UE-ID, payload)"), and may generate a packet that includes data identifying the IP address of the SCEF as a source IP address, the other port of the SCEF as a source port, the IPv6 address of user equipment 105 as a destination IP address, the port of user equipment 105 as a destination port, and the data destined for user equipment 105. The SCEF may cause the packet to be forwarded to user equipment 105. For example, the SCEF may send, to user equipment 105 and via the SGW/PGW and RAN 110, a UDP IP test packet that includes data (e.g., "IP header: srcip=scefip, src-port=scefport, dest-ip=ue-ip, dest-port=ue-port, payload)").

As further shown in FIG. 1F, the SCEF may receive, from user equipment 105 and via RAN 110 and the SGW/PGW, a packet with data destined for application server 120, and may cause the packet to be forwarded to application server 120. The packet may include data identifying the IPv6 address of user equipment 105 as a source IP address, the port of user equipment 105 as a source port, the IP address of the SCEF as a destination IP address, the other port of the SCEF as a destination port, and the data destined for application server 120. For example, user equipment 105 may send, to the SCEF and via RAN 110 and the SGW/PGW, a UDP IP message that includes data (e.g., "IP header: srcip=ueip, src-port=ueport, dest-ip=scef-as-p, dest-port=scef-as-port, payload)"). The SCEF may then send, to application server 120, a REST message that includes the data destined for application server 120 (e.g., "IP_Data_Response (UE-ID, payload)").

In this way, the SCEF of core network 115 acquires an IPv6 address of user equipment 105 associated with RAN 110 and core network 115. This enables PDN IP traffic flow QoS control services, SCEF or application server-initiated data deliveries to the user equipment, API services provided by the SCEF, services provided by the application server, and/or the like to be provided to the user equipment. Thus, the SCEF conserves computing resources, networking resources, and/or the like that would otherwise have been wasted attempting to identify an IP address of the user equipment, providing data to an incorrect IP address of the user equipment, failing to provide data to the user equipment, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
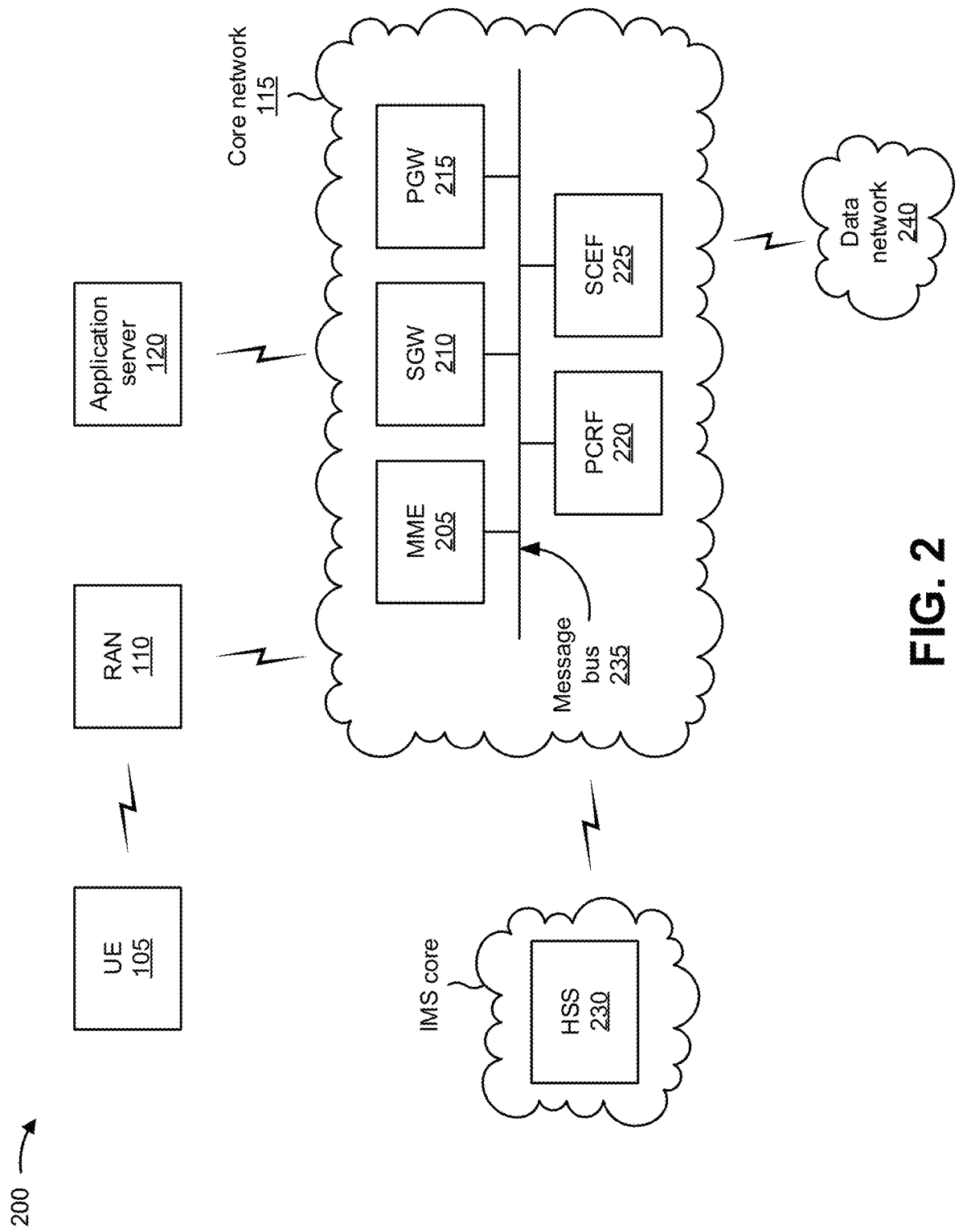
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, application server 120, and a data network 240. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for user equipment 105. RAN 110 may transfer traffic between user equipment 105 (e.g., using a cellular RAT), base stations (e.g., using a wireless interface or a backhaul interface, such as a wired backhaul interface), and/or core network 115. RAN 110 may provide one or more cells that cover geographic areas.

RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

Core network 115 may include an evolved packet core (EPC) network that operates based on a third generation partnership project (3GPP) wireless communication standard. As shown in FIG. 2, core network 115 may include a mobility management entity device (MME) 205, a serving gateway (SGW) 210, a packet data network gateway (PGW) 215, a policy and charging rules function (PCRF) 220, and an SCEF 225 that enable user equipment 105 to communicate with application server 120, data network 240, and/or an Internet protocol (IP) multimedia subsystem (IMS) core. Elements of core network 115 may interconnect via a message bus 235, as further shown in FIG. 2. The IMS core may include a home subscriber server (HSS) 230, and may manage device registration and authentication, session initiation, and/or the like, associated with user equipment 105. HSS 230 may reside in core network 115 and/or the IMS core.

MME 205 includes one or more devices, such as one or more server devices, capable of managing authentication, activation, deactivation, and/or mobility functions associated with user equipment 105. MME 205 may perform operations relating to authentication of user equipment 105. Additionally, or alternatively, MME 205 may facilitate the selection of a particular SGW 210 and/or a particular PGW 215 to serve traffic to and/or from user equipment 105. MME 205 may perform operations associated with handing off user equipment 105 from a first RAN 110 to a second RAN 110 when user equipment 105 is transitioning from a first cell associated with the first RAN 110 to a second cell associated with the second RAN 110. Additionally, or alternatively, MME 205 may select another MME (not pictured), to which user equipment 105 should be handed off (e.g., when user equipment 105 moves out of range of MME 205).

SGW 210 includes one or more devices capable of routing packets. For example, SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. SGW 210 may aggregate traffic received from one or more RANs 110, and may send the aggregated traffic to data network 240 (e.g., via PGW 215) and/or other network devices associated with core network 115 and/or the IMS core. SGW 210 may also receive traffic from data network 240 and/or other network devices, and may send the received traffic to user equipment 105 via RAN 110. Additionally, or alternatively, SGW 210 may perform operations associated with handing off user equipment 105 to and/or from an LTE network.

PGW 215 includes one or more devices capable of providing connectivity for user equipment 105 to external packet data networks (e.g., other than the depicted core network 115). For example, PGW 215 may include one or more data processing and/or traffic transfer devices, such as a gateway, a router, a modem, a switch, a firewall, a NIC, a hub, a bridge, a server device, an OADM, or any other type of device that processes and/or transfers traffic. PGW 215 may aggregate traffic received from one or more SGWs 210, and may send the aggregated traffic to data network 240. Additionally, or alternatively, PGW 215 may receive traffic from data network 240, and may send the traffic to user equipment 105 via SGW 210 and RAN 110. PGW 215 may record data usage information (e.g., byte usage).

PCRF 220 includes one or more devices, such as one or more server devices, capable of providing policy control decision and flow-based charging control functionalities. For example, PCRF 220 may provide network control regarding service data flow detection, gating, quality of service (QoS) and flow-based charging, and/or the like. PCRF 220 may determine how a certain service data flow is to be treated, and may ensure that user plane traffic mapping and treatment is in accordance with a user subscription profile.

SCEF 225 includes one or more devices that receive, store, generate, determine, provide, and/or the like information associated with a group messaging service. For example, SCEF 225 may include a server device or a group of server devices. SCEF 225 may perform one or more actions performed by a network exposure function (NEF) and/or a network repository function (NRF).

HSS 230 includes one or more devices, such as one or more server devices, capable of managing (e.g., receiving, generating, storing, processing, providing, and/or the like) information associated with user equipment 105. For example, HSS 230 may manage subscription information associated with user equipment 105, such as information associated with a subscriber profile of a user associated with user equipment 105, information associated with services and/or applications that are accessible to user equipment 105, location information associated with user equipment 105, a network identifier (e.g., a network address) associated with user equipment 105, information associated with a treatment of user equipment 105 (e.g., quality of service information, a quantity of minutes allowed per time period, a quantity of data consumption allowed per time period, and/or the like), and/or the like. HSS 230 may provide this information to one or more other devices of environment 200 to support the operations performed by those devices.

Message bus 235 represents a communication structure for communication among the elements of core network 115. In other words, message bus 235 may permit communication between two or more elements of core network 115.

Although core network 115 is shown as a fourth generation (4G) architecture, core network 115 may include other architectures in which systems and/or methods described herein may be implemented. For example, core network 115 may include an example architecture of a fifth generation (5G) next generation (NG) core network included in a 5G wireless telecommunications system.

For example, the 5G NG core network may include a number of functional elements. The functional elements may include, for example, a network slice selection function (NSSF), a network exposure function (NEF), an authentication server function (AUSF), a unified data management (UDM) component, a policy control function (PCF), an application function (AF), an access and mobility management function (AMF), a session management function (SMF), a user plane function (UPF), and/or the like. These functional elements may be communicatively connected via a message bus 235. Each of the functional elements may be implemented on one or more devices associated with a wireless telecommunications system. One or more of the functional elements may be implemented on physical devices, such as an access point, a base station, a gateway, and/or the like. One or more of the functional elements may be implemented on a computing device of a cloud computing environment.

The NSSF includes one or more devices that select network slice instances for user equipment 105. By providing network slicing, the NSSF allows an operator to deploy multiple substantially independent end-to-end networks potentially with the same infrastructure. In some implementations, each slice may be customized for different services. The NEF includes one or more devices that support exposure of capabilities and/or events in the wireless telecommunications system to help other entities in the wireless telecommunications system discover network services. The AUSF includes one or more devices that act as an authentication server and support the process of authenticating user equipment 105 in the wireless telecommunications system. The UDM includes one or more devices that store user data and profiles in the wireless telecommunications system. The UDM may be used for fixed access, mobile access, and/or the like, in core network 115. The PCF includes one or more devices that provide a policy framework that incorporates network slicing, roaming, packet processing, mobility management, and/or the like. The AF includes one or more devices that support application influence on traffic routing, access to the NEF, policy control, and/or the like. The AMF includes one or more devices that act as a termination point for NAS signaling, mobility management, and/or the like. The SIVIF includes one or more devices that support the establishment, modification, and release of communication sessions in the wireless telecommunications system. The UPF includes one or more devices that serve as an anchor point for intraRAT and/or interRAT mobility. The UPF may apply rules to packets, such as rules pertaining to packet routing, traffic reporting, handling user plane QoS, and/or the like.

Application server 120 includes one or more devices capable of receiving, generating, storing, processing, and/or providing information, such as information described herein. For example, application server 120 may include a laptop computer, a tablet computer, a desktop computer, a group of server devices, or a similar type of device. Application server 120 may receive information from and/or transmit information to user equipment 105 and/or core network 115.

Data network 240 includes one or more wired and/or wireless data networks. For example, data network 240 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
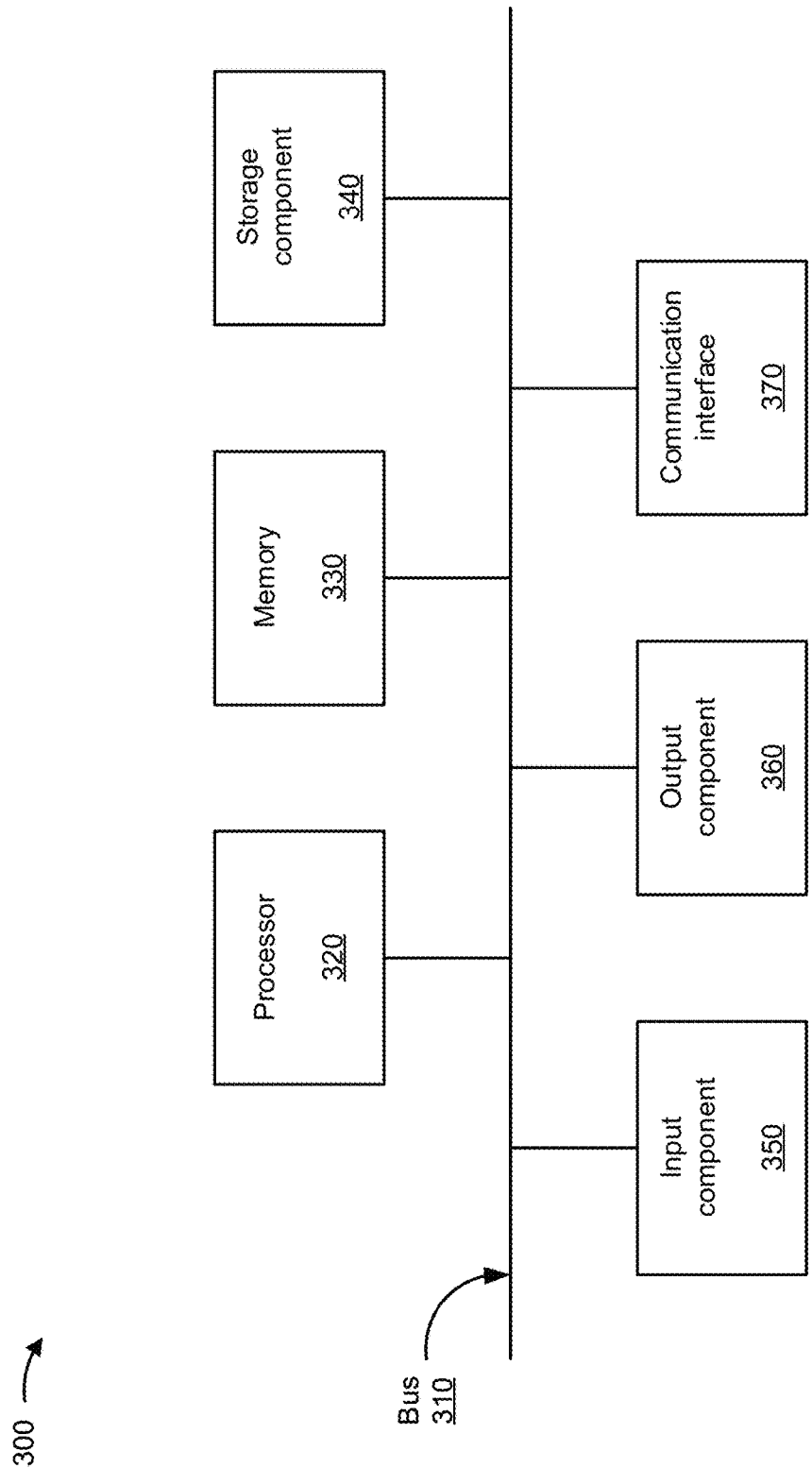
FIG. 3 is a diagram of example components of one or more devices of FIG. 2.

FIG. 3 is a diagram of example components of a device 300. Device 300 may correspond to user equipment 105, application server 120, MME 205, SGW 210, PGW 215, PCRF 220, SCEF 225, and/or HSS 230. In some implementations, user equipment 105, application server 120, MME 205, SGW 210, PGW 215, PCRF 220, SCEF 225, and/or HSS 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for acquiring a particular IP network address of a user equipment in networks. In some implementations, one or more process blocks of FIG. 4 may be performed by a network device (e.g., SCEF 225). In some implementations, one or more process blocks of FIG. 4 may be performed by another device or a group of devices separate from or including the device, such as a user equipment (e.g., user equipment 105), an application server (e.g., application server 120), and/or a MME (e.g., MME 205).

As shown in FIG. 4, process 400 may include determining that an application server requires an IPv6 address of a user equipment associated with a network (block 410). For example, the network device (e.g., using processor 320, memory 330, communication interface 370, and/or the like) may determine that an application server requires an IPv6 address of a user equipment associated with a network, as described above. In some implementations, determining that the application server requires the IPv6 address of the user equipment includes receiving account session information associated with creation of a session for the user equipment, and determining that the application server requires the IPv6 address of the user equipment based on the receiving the account session information.

As further shown in FIG. 4, process 400 may include providing, to another network device of the network, a request for the IPv6 address of the user equipment, wherein the request includes data identifying an IP address of the network device and a port of the network device, and wherein the request is to cause the other network device to provide the request for the IPv6 address to the user equipment via a short message service (SMS) request message, and receive, from the user equipment, data identifying the IPv6 address and a port of the user equipment via a SMS response message (block 420). For example, the network device (e.g., using processor 320, storage component 340, communication interface 370, and/or the like) may provide, to another network device of the network, a request for the IPv6 address of the user equipment, as described above. In some implementations, the request includes data identifying an IP address of the network device and a port of the network device. In some implementations, the request is to cause the other network device to provide the request for the IPv6 address to the user equipment via a SMS request message, and receive, from the user equipment, data identifying the IPv6 address and a port of the user equipment via a SMS response message.

In some implementations, the network device includes a service capability exposure function and the other network device includes a mobility management entity. In some implementations, the request is to cause the user equipment to assign the IPv6 address and the port of the user equipment on behalf of the application server. In some implementations, the request is to cause the user equipment to store the IP address and the port of the network device.

As further shown in FIG. 4, process 400 may include receiving from the other network device, and based on the request, a response that includes the data identifying the IPv6 address and the port of the user equipment (block 430). For example, the network device (e.g., using processor 320, communication interface 370, and/or the like) may receive from the other network device, and based on the request, a response that includes the data identifying the IPv6 address and the port of the user equipment, as described above.

As further shown in FIG. 4, process 400 may include storing the data identifying the IPv6 address and the port of the user equipment (block 440). For example, the network device (e.g., using processor 320, memory 330, storage component 340, and/or the like) may store the data identifying the IPv6 address and the port of the user equipment, as described above.

Process 400 may include additional implementations, such as any single implementation or any combination of implementations described below and/or in connection with one or more other processes described elsewhere herein.

In some implementations, process 400 includes receiving, from the application server, data destined for the user equipment; generating a packet based on receiving the data destined for the user equipment, wherein the packet may include data identifying the IP address of the network device as a source IP address, the port of the network device as a source port, the IPv6 address of the user equipment as a destination IP address, the port of the user equipment as a destination port, and the data destined for the user equipment; and causing the packet to be forwarded to the user equipment.

In some implementations, process 400 includes providing, to the application server, a report that includes the data identifying the IPv6 address and the port of the user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  determining, by a network device of a network, that an application server requires an Internet protocol (IP) version six (IPv6) address of a user equipment associated with the network;
  providing, by the network device and to another network device of the network, a request, including an IP address of the network device, and a port of the network device, for the IPv6 address of the user equipment,
    the request, causing the other network device to:
      provide the request for the IPv6 address to the user equipment via a short message service (SMS) request message, and
      receive, from the user equipment, data identifying the IPv6 address and a port of the user equipment via a SMS response message;
  receiving, by the network device, from the other network device, and based on the request, a response that includes the data identifying the IPv6 address and the port of the user equipment; and
  storing, by the network device, the data identifying the IPv6 address and the port of the user equipment.

2. The method of claim 1, further comprising:
  receiving, from the application server, data destined for the user equipment;
  generating a packet based on receiving the data destined for the user equipment,
    wherein the packet includes data identifying:
      the IP address of the network device as a source IP address,
      the port of the network device as a source port,
      the IPv6 address of the user equipment as a destination IP address,
      the port of the user equipment as a destination port, and
      the data destined for the user equipment; and
  causing the packet to be forwarded to the user equipment.

3. The method of claim 1, wherein the network device includes a service capability exposure function or a network exposure function and the other network device includes a mobility management entity or an access and mobility management function.

4. The method of claim 1, further comprising:
  providing, to the application server, a report that includes the data identifying the IPv6address and the port of the user equipment.

5. The method of claim 1, wherein the request is to cause the user equipment to assign the IPv6 address and the port of the user equipment on behalf of the application server.

6. The method of claim 1, wherein the request is to cause the user equipment to store the IP address and the port of the network device.

7. The method of claim 1, wherein determining that the application server requires the IPv6 address of the user equipment comprises:
- receiving account session information associated with creation of a session for the user equipment; and
- determining that the application server requires the IPv6 address of the user equipment based on the receiving the account session information.

8. A network device, comprising:
one or more processors configured to:
- receive, from another network device of a network, a connection management request to create a non-Internet protocol (IP) packet data network session associated with a user equipment of the network;
- determine that an application server requires an Internet protocol (IP) version six (IPv6) address of the user equipment based on receiving the connection management request;
- provide, to the other network device, a connection management answer in response to the connection management request,
  - wherein the connection management answer includes data identifying:
    - an IP address of the network device, and
    - a port of the network device,
  - wherein the connection management answer is to cause the other network device to:
    - provide the data identifying the IP address and the port of the network device to the user equipment via a user equipment attach accepted message, and
    - receive, from the user equipment, data identifying the IPv6 address and a port of the user equipment;
- receive, from the other network device and based on the connection management answer, a response that includes the data identifying the IPv6 address and the port of the user equipment; and
- store the data identifying the IPv6 address and the port of the user equipment.

9. The network device of claim 8, wherein the one or more processors are further configured to:
- receive, from the application server, data destined for the user equipment;
- generate a packet based on receiving the data destined for the user equipment,
  - wherein the packet includes data identifying:
    - the IP address of the network device as a source IP address,
    - the port of the network device as a source port,
    - the IPv6 address of the user equipment as a destination IP address,
    - the port of the user equipment as a destination port, and
    - the data destined for the user equipment; and
- cause the packet to be forwarded to the user equipment.

10. The network device of claim 8, wherein the network device includes a service capability exposure function and the other network device includes a mobility management entity.

11. The network device of claim 8, wherein the one or more processors are further configured to:
- provide, to the application server, a report that includes the data identifying the IPv6 address and the port of the user equipment.

12. The network device of claim 8, wherein the connection management answer is to cause the user equipment to assign the IPv6 address and the port of the user equipment for traffic received from the application server.

13. The network device of claim 8, wherein the connection management answer is to cause the user equipment to store the data identifying the IP address and the port of the network device as destination information for traffic to be provided to the application server.

14. The network device of claim 8, wherein the one or more processors, when receiving the connection management request to create the non-IP packet data network session associated with the user equipment, are configured to:
- receive the connection management request to create the non-IP packet data network session associated with the user equipment based on a request for the non-IP packet data network session generated by the user equipment.

15. A non-transitory computer-readable medium storing instructions, the instructions comprising:
one or more instructions that, when executed by one or more processors of a network device of a network, cause the one or more processors to:
- receive, from a user equipment associated with the network, an Internet protocol (IP) test packet request,
  - wherein the IP test packet request includes data identifying:
    - an IP version six (IPv6) address of the user equipment as a source IP address,
    - a port of the user equipment as a source port,
    - an IP address of the network device as a destination IP address,
    - a port of the network device as a destination port, and
    - a payload that includes a request for acknowledgment of the IP test packet request;
- store the data identifying the IPv6 address and the port of the user equipment;
- generate an IP test packet response based on the IP test packet request,
  - wherein the IP test packet response includes data identifying:
    - the IP address of the network device as a source IP address,
    - another port of the network device as a source port,
    - the IPv6 address of the user equipment as a destination IP address,
    - the port of the user equipment as a destination port, and
    - a payload that includes an acknowledgment for the IP test packet request; and
- provide the IP test packet response to the user equipment.

16. The non-transitory computer-readable medium of claim 15, wherein the one or more instructions, when executed by the one or more processors, further cause the one or more processors to:
- receive, from an application server, data destined for the user equipment;
- generate a packet based on receiving the data destined for the user equipment,
  - wherein the packet includes data identifying:
    - the IP address of the network device as a source IP address,
    - the other port of the network device as a source port,
    - the IPv6 address of the user equipment as a destination IP address, the port of the user equipment as a destination port, and the data destined for the user equipment; and cause the packet to be forwarded to the user equipment.

17. The non-transitory computer-readable medium of claim 15, wherein the one or more instructions, when executed by the one or more processors, further cause the one or more processors to:

receive, from the user equipment, a packet with data destined for an application server, wherein the packet includes data identifying:

the IPv6 address of the user equipment as a source IP address, the port of the user equipment as a source port, the IP address of the network device as a destination IP address, the other port of the network device as a destination port, and the data destined for the application server; and cause the packet to be forwarded to the application server.

18. The non-transitory computer-readable medium of claim 15, wherein the one or more instructions, when executed by the one or more processors, further cause the one or more processors to:

provide, to an application server, a report that includes the data identifying the IPv6 address and the port of the user equipment.

19. The non-transitory computer-readable medium of claim 15, wherein the network device includes a service capability exposure function.

20. The non-transitory computer-readable medium of claim 15, wherein the IP test packet request is received from the user equipment based on a fully qualified domain name associated with the network device.

* * * * *